United States Patent [19]

Nagano

[11] Patent Number: 5,122,872
[45] Date of Patent: Jun. 16, 1992

[54] PICTURE DATA MEMORY SYSTEM FOR STORING BOTH BLACK AND WHITE AND COLOR PICTURE DATA WITH DIFFERENT RESOLUTIONS

[75] Inventor: Fumikazu Nagano, Nara, Japan

[73] Assignee: Sharp Kabushiki Kaisha, Osaka, Japan

[21] Appl. No.: 649,000

[22] Filed: Jan. 31, 1991

Related U.S. Application Data

[63] Continuation-in-part of Ser. No. 525,313, May 21, 1990, which is a continuation of Ser. No. 249,274, Sep. 22, 1988, abandoned, which is a continuation of Ser. No. 875,869, Jun. 18, 1986, abandoned.

[30] Foreign Application Priority Data

Jun. 20, 1985 [JP] Japan ................ 60-135011

[51] Int. Cl.$^5$ .............................. H04N 1/46
[52] U.S. Cl. ......................... 358/78; 358/75
[58] Field of Search .......... 358/75, 78, 79, 80, 358/296; 355/32, 220

[56] References Cited

U.S. PATENT DOCUMENTS

| | | | |
|---|---|---|---|
| 4,228,468 | 10/1980 | Nagano et al. | 358/280 |
| 4,485,413 | 11/1984 | Furuta et al. | 358/334 |
| 4,496,989 | 1/1985 | Hirosawa | 358/75 |
| 4,517,590 | 5/1985 | Nagashima et al. | 358/75 |
| 4,553,172 | 11/1985 | Yamada et al. | 358/75 |
| 4,589,035 | 5/1986 | Yamanishi et al. | 358/296 |
| 4,631,577 | 12/1986 | Yamanishi | 358/75 |
| 4,642,680 | 2/1987 | Yamada | 358/78 |
| 4,647,962 | 3/1987 | Rosen et al. | 358/78 |
| 4,668,978 | 5/1987 | Gokita | 358/78 |
| 4,718,040 | 1/1988 | Ayeta et al. | 358/77 |
| 4,739,397 | 4/1988 | Hayashi | 358/78 |

FOREIGN PATENT DOCUMENTS 0138221 4/1985 European Pat. Off.
3336588 4/1984 Fed. Rep. of Germany.
3417188 11/1984 Fed. Rep. of Germany.
2110045 6/1983 United Kingdom.
2132052 6/1984 United Kingdom.

*Primary Examiner*—James J. Groody
*Assistant Examiner*—Kim Yen Vu

[57] ABSTRACT

In view of the memory or storage disadvantage inherent in conventional picture data memory systems, a picture data memory system provides a system with simplified memory control which equalizes the amounts of the color and black/white picture element data by reducing the resolution of the color picture element data (a picture element representing an area scanned by at least one CCD element) to one-quarter of the resolution of black/white picture element data. The picture data memory system constitutes memory locations having a bit size in accordance with the resolution of the color picture when reproduced by the color printer. By doing so, the numbers of bits are equal for the picture element data of both the color and black/white pictures, thereby allowing the storing of color and black/white picture element data in the memory that has a storage capacity that is no greater than a memory storing only black/white picture data. This system includes picture memory for storing binary data representing both color gradation data and black/white concentration data of each picture element; a controller for producing either a color or a black/white mode select signal; a scanner for producing either color gradation data or black/white concentration data; a first buffer memory for storing color gradation data; a second buffer memory for storing black/white concentration data; and a selector for selecting data from either the first or the second buffer memory to be written into a specific address of the picture memory means. The number of bits representing color gradation data or black/white concentration data written into each address of the picture memory are set to be equal to each other.

10 Claims, 8 Drawing Sheets

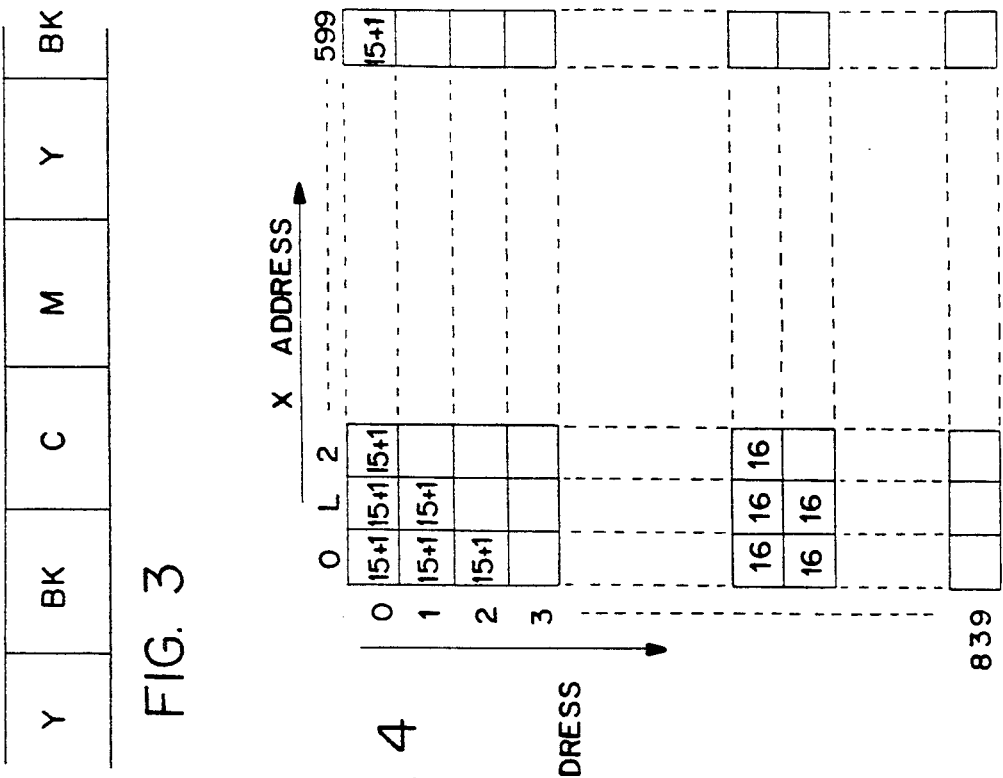
FIG. 3
FIG. 4
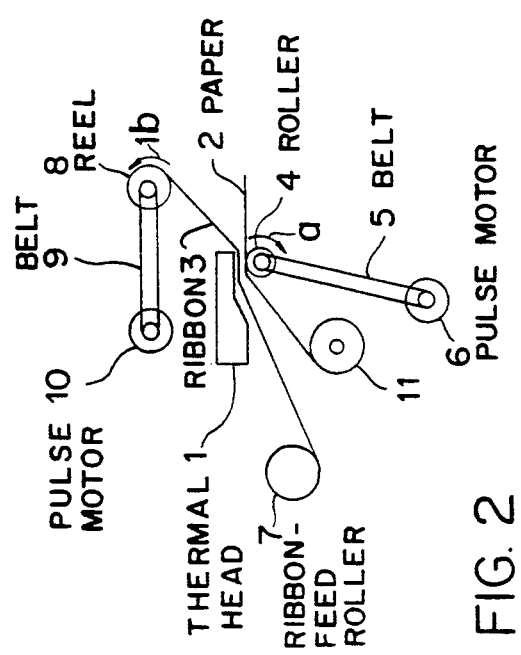
FIG. 2
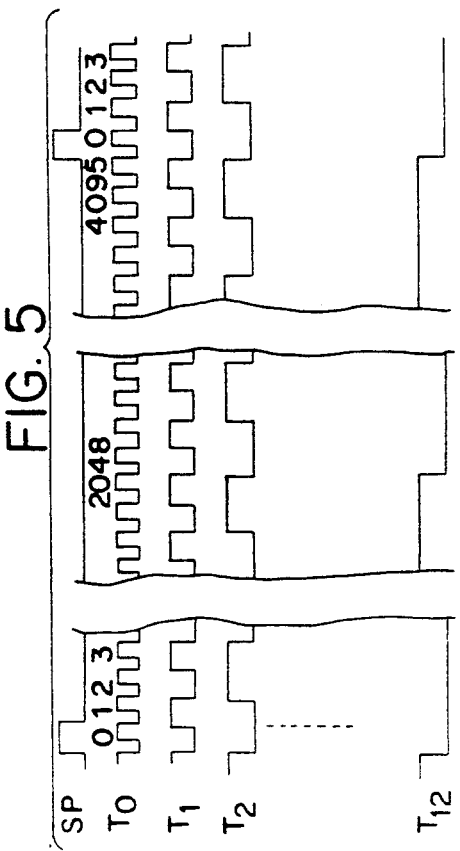
FIG. 5

PICTURE DATA MEMORY SYSTEM FOR STORING BOTH BLACK AND WHITE AND COLOR PICTURE DATA WITH DIFFERENT RESOLUTIONS

This application is a continuation-in-part of application, Ser. No. 07/525,313, filed on May 21, 1990, which is a continuation of Ser. No. 07/249,274 filed on Sep. 22, 1988, now abandoned; which is a continuation of Ser. No. 06/875,869 filed on Jun. 18, 1986, now abandoned.

BACKGROUND OF THE PRESENT INVENTION

Conventional color printers record medial tone color data composed of the three primary colors, yellow, magenta, and cyan by means of the "dither method" at a predetermined resolution. When recording color data together with black/white data, if the color data is recorded using a specific resolution identical to that of the black/white information, an enormous amount of color information needs to be stored. This color information corresponds to three times the black/white data needed, thus complicating the memory control of the picture data. The human eye has a relatively high visual sensitivity to black/white data, but a low visual sensitivity to color data. Consequently, the resolution of color picture data can be lowered considerably without any detectable change in the quality of the picture itself.

SUMMARY AND OBJECTS OF THE PRESENT INVENTION

In view of the memory or storage disadvantages inherent in conventional picture data memory systems mentioned above, the present invention aims to provide a picture data memory system with simplified memory control which equalizes the number of bits representing the color picture element data with the number of bits representing black/white picture element data. This equalization is realized by reducing the resolution of the color picture image to one-quarter of the resolution of black/white picture image. The picture data memory system embodied by the present invention constitutes memory locations having a bit size in accordance with the resolution of the color picture when reproduced by the color printer. By doing so the present invention equalizes the numbers of bits for the picture element data of both the color and black/white pictures, thereby allowing the storing of color picture element data or black/white picture element data, or both, in a memory that has a storage capacity which is no greater than a memory storing only black/white picture data.

It is an object of the present invention to arrange picture element data generated by CCD elements so that the storage space required for color picture element data is equal to the storage space required for black/white picture element data.

It is another object of the present invention to reduce the resolution of the color picture image so that the storage space required for producing a color copy is reduced.

It is still another object of the present invention to establish a relationship between the color picture image resolution and the black/white picture image resolution so that a color picture can be produced without requiring a memory storage capacity greater than the memory storage capacity required for a black/white operation.

These objects, as well as other advantages, are realized by an apparatus embodied by the present invention wherein the apparatus comprises a picture memory for storing binary data representing both color gradation data and black/white concentration data of each picture element of a picture to be processed; a controller for producing either a color or a black/white mode select signal in response to a color or black/white mode selected by a user; a scanner for producing either color gradation data or black/white concentration data from the scanning of an original picture by the scanner in response to the mode select signal; a first buffer memory for storing color gradation data produced by the scanner; a second buffer memory for storing black/white concentration data produced by the scanner; and a selector for selecting data from either the first or the second buffer memory to be written into a specific address of the picture memory; wherein the number of bits representing color gradation data or black/white concentration data written into each address of the picture memory are set to be equal to each other.

BRIEF DESCRIPTION OF THE DRAWINGS

The various advantages discussed above, as well as, the present invention will be better understood from the detailed description given below and the accompanying drawings which are given by way of illustration only, and thus do not limit the present invention wherein:

FIG. 2 is a simplified diagram of a color printer related to one of the preferred embodiments of the present invention;

FIG. 3 is a diagram of the transference ink ribbon related to one of the preferred embodiments of the present invention;

FIG. 4 is a diagram of the memory structural format of the page memory related to one of the preferred embodiments of the present invention;

FIGS. 5 and 6 are operation timing charts of one of the preferred embodiments of the present invention;

DESCRIPTION OF THE PREFERRED EMBODIMENTS

Figure 1:
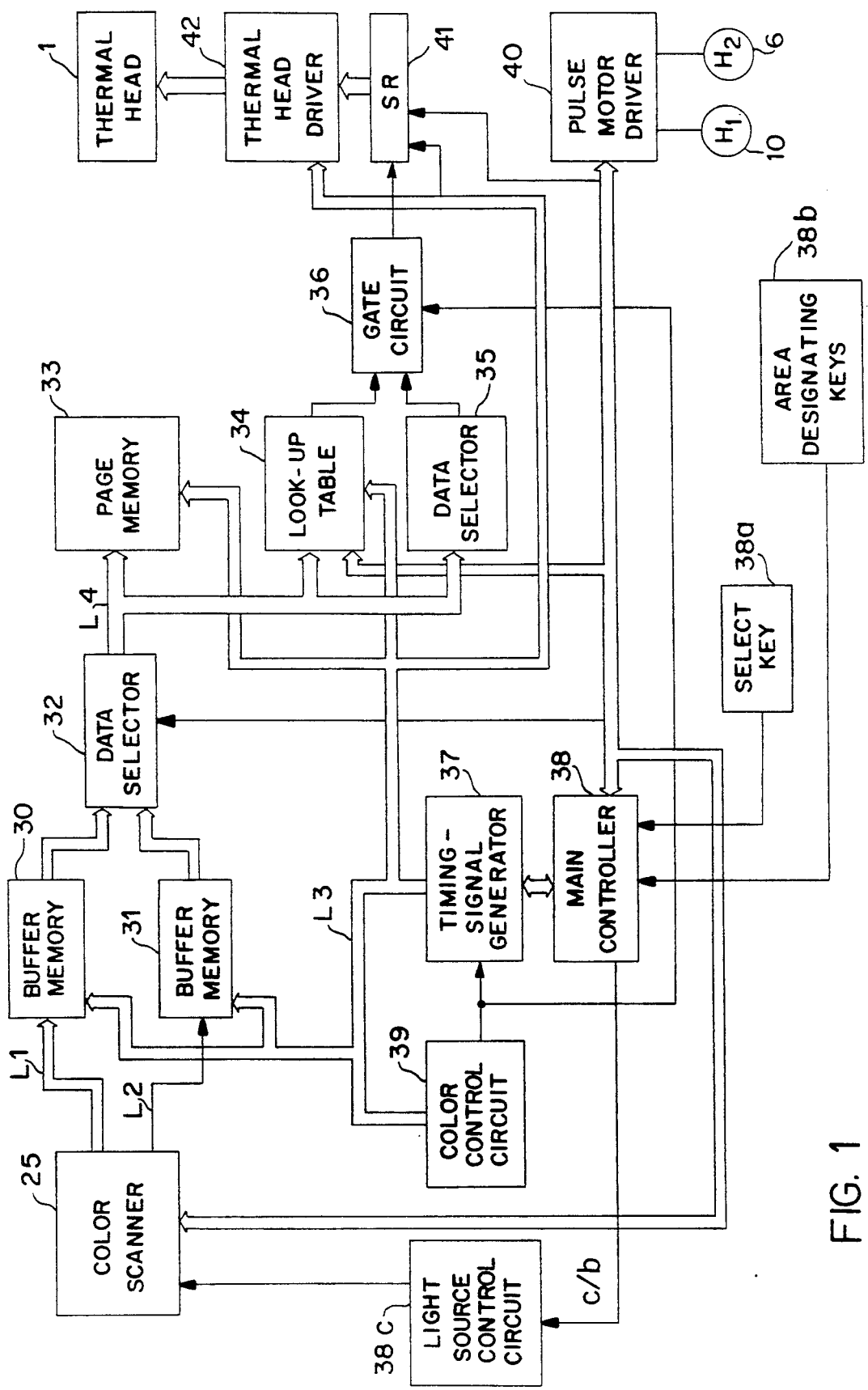
FIG. 1 is a block diagram of one of the preferred embodiments of the present invention.

Referring now to the accompanying drawings, one of the preferred embodiments of the present invention is described below. FIG. 2 represents the mechanism of the color printer incorporating one of the preferred embodiments of the present invention. A thermal head 1 is provided so that it is aligned in the same direction as a printing paper 2.

In this example, the thermal head 1 contains 2400 units of recording elements allowing for a 12-dot/mm of resolution, thus making it possible for the color printer to print data on A4 size paper. The thermal head 1 is pressed against a platen roller 4 via a transference ribbon 3 and the printing paper 2 by the force of a spring (not shown). The platen roller 4 is rotated in the direction of arrow "a" by a pulse motor 6 via a timing belt 5. The transference ribbon 3 is drawn out of a ribbon-feed roller 7 before being wound onto a take-up reel 8 after passing through the space between the thermal head 1 and the platen roller 4.

As shown in FIG. 3, according to the paper size (A4 for example), the transference ribbon 3 is provided sequentially with sections Y, BK, C, and M, which are, respectively, coated with yellow, black, cyan, and magenta color materials. The take-up roll 8 is rotated in the direction of arrow "b" by a pulse motor 10 via a timing belt 9. The printing paper 2, made of ordinary paper, is fed from a printing-paper roll 11 and through a space positioned between the thermal head 1 and the platen roller 4.

The thermal head 1 first heats the transference ink ribbon 3 from the back surface to dissolve the color material and then transfers the dissolved color material onto the printing paper 2. As soon as printing of a specific color is completed for an area of the sheet the printing paper 2 is returned to its initial position and the following color is printed on the same area of the sheet of the printing paper 2. These sequential operations are repeatedly performed for yellow, magenta, cyan, and black. After completing all the needed operations, the printing paper 2 is led to a cutter (not shown), and is then cut into sheets before being delivered. This printing paper can also be single sheets of paper and thus, a cutter is unnecessary.

Next, the method for reading an original picture and converting it into picture element data for delivery to the color printer is described. Like the thermal head 1 mentioned above, a color scanner for reading the original picture is provided with 2400 units of line-type CCD elements (approximately corresponding to the width of an A4 size sheet of paper) when a 12-line/mm of black/white resolution is desired. The color scanner causes analog signals corresponding to the light reflected from the original picture lit by a light source to be converted into digital signals having 4-bits of digital data per four CCD elements. If in a color mode, the color scanner averages the 4-bits of digital data of the colored original picture received from the 4 individual CCD elements to generate 5-bit color gradation data having a 3-line/mm resolution. If a black/white mode is established, the digital data is not average but passes through the scanner and is outputted as black/white concentration data. The averaging of 4-bits of picture data to obtain a 5-bit color gradation data is described in more detail below with respect to FIGS. 12(A), 12(B), and 12(C).

The color scanner is provided with three kinds of light sources, one for each of the three primary colors, red, green, and blue. The system causes each light source to sequentially flash at predetermined cyclical intervals (related to signal SP described later). This causes the system to sequentially generate color gradation data matching respective colors of picture data per scan line. As a result, the color scanner continuously outputs 15-bit signals (3 units of color gradation data, each having 5 bits associated therewith) of color gradation data for a single color picture element. A single color picture element is represented by a 4×4 matrix of CCD elements in this embodiment.

When scanning a black/white original picture, the color scanner simultaneously and continuously lights up all the respective light sources. The scanner compares the signal from each individual CCD element to a predetermined threshold reference value and then generates a digital 1-bit black/white concentration data per CCD element comprised of either a "1" (black) or "0" (white) code. This generation of digital black/white concentration data enables a 12-line/mm resolution. The scanner then sequentially outputs the black/white concentration data for each scanned line.

Although the generation of picture data is not limited to the method described above, it is desirable to generate color gradation data wherein each color picture element has approximately 16-bits associated therewith (5-bit color ×3 colors and a 16th-bit which is a redundant bit, in this preferred embodiment). In addition, when dealing with either a colored original or black/white original, it is also possible for the color scanner to generate picture data for one color by powering only one of the three kinds of light sources. To determine whether the color scanner reads the color or black/white original, the user can activate the full-color versus black/white mode select key 38a or area designating keys 38b or the present invention can receive a command signal from a data processing unit.

FIG. 1 is a simplified block diagram of the picture processor which feeds the picture data to the color printer mentioned above. In accordance with a command signal from a main controller 38, a color scanner 5 reads the original picture in order to provide data bus L1 with 5-bit color gradation data (this 5-bit color gradation data is generated from the original generation of 4-bits by 4 CCD elements) or data bus L2 with black/white concentration data. Buffer memories 30 and 31, are provided with a capacity to store data representing four scanned lines of the original picture. The picture data for buffer memory 30 is color gradation data received from data bus L1, whereas the picture data for buffer memory 31 is black/white concentration data received from the data bus L2. In accordance with a timing signal received from a timing-signal generator 37 via timing bus L3, the buffer memories 30 and 31 read and write data.

In response to a color/black-white mode select signal FCM fed from the main controller 38, a data selector 32 selects either the color gradation data signal from the buffer memory 30 or the black/white concentration data signal from the buffer memory 31 to be outputted onto a data bus L4. Signal FCM is generated in response to the signals received from the selected key 38a and the area designating keys 38b. In other words, signal FCM informs the data selector when a color portion has been scanned, and color gradation data is available for storage. A page memory 33 stores either color gradation data or black/white concentration data received from the data bus L4. The page memory 33 has a specific memory capacity corresponding to an A4 size original picture and executes reading and writing operations upon the data in accordance with a timing signal from the timing bus L3.

FIG. 4 represents a possible memory layout for the page memory 33. The page memory 33 is provided with a specific number of memory compartments each corresponding to a single picture element. The compartments can store two 8-bit bytes of picture data. The color gradation data is represented by 16 bits (15 bits×5 bits/color ×3 colors and 1 redundant bit.) Black/white concentration data also uses 16 bits (4 main scan lines×4 CCD elements/line). This structuring of the picture data enables an individual memory compartment to store either a picture element of color gradation data or a picture element of black/white concentration data without reconfiguring the sectionalization of the page memory 33.

FIG. 4 demonstrates an example where the original has a color image in the upper half of the original and a black/white image in the lower half. The actual configuration of the image data is dependent upon the instructions received from the user through the area designating keys 38b or command signals from a data processor. In this example, the upper compartments of the page memory 33, as shown in FIG. 4, store color gradation data, whereas the lower compartments store black/white concentration data. The division between memory areas for color gradation data and black/white concentration data of the page memory 33 is set in accordance with the coordinates inputted by the user or data processor. If the original was layed out like the example illustrated by FIG. 11(B), the page memory 33 would have an upper section having black/white concentration data, a middle section having color gradation data, and a lower section having black/white concentration data.

A color control circuit 39 outputs control signals needed for setting the division between these memory areas which are received by the timing-signal generator 37 so that the division between these memory areas can be set. The color control circuit 39 is comprised of memories X and Y which respectively store data related to the X and Y coordinates received from the main controller 38, while the corresponding compartments of the page memory 33 are determined by data stored in memories X and Y. The X and Y coordinates generated by the main controller 38 are set according to the input from select key 38a and area designating keys 38b. The memory matrix arrangement while the Y coordinate information can be related to a column position in a memory matrix arrangement. Thus, the memory areas can be defined accordingly. In the preferred embodiment, the main controller 38 merely sets the color memory area and the remaining area(s) defaults to black/white area(s).

Picture data stored in the page memory 33 is read out in accordance with timing signals received from the timing bus L3. If the stored picture data are color gradation data, the data signal is received by a look-up table 34 via data bus L4. If the stored picture data are black/white concentration data, the data signal is received by a data selector 35 via the data bus L4. The look-up table 34 is controlled by a timing signal from the timing bus L3 and a control signal from the main controller 38. The look-up table 34 primarily comprises a ROM which preliminarily stores data needed for converting color gradation data related to red, green, and blue, into data related to three primary colors (yellow, magenta, cyan) and black. The look-up table 34 serially outputs 1-bit recording data indicating whether or not the recording of the respective colors should be done in synchronization with the operation of the color printer. This data from the look-up table 34 is received by a gate circuit 36.

Likewise, synchronous with the operation of the color printer, the data selector 35 outputs the 1-bit recording data indicating whether or not recording should be done according to the received black/white concentration data and outputs the recording data to the gate circuit 36.

In accordance with a control signal from the main controller 38, the gate circuit 36 selects either the recording signals from the look-up table 34 or the data selector 35 and outputs the selected data to a shift register 41, which has 1-line memory capacity. This control signal is generated like the control signal for the data selector 32 by the main controller 38 according to the input received from select key 38a and area designating keys 38b. After converting the received recording data into parallel data, the shift register 41 outputs this parallel data to a thermal head driver 42, which then drives the thermal head 1 in accordance with the received parallel data. In response to a control signal from the main controller 38, a pulse motor driver 40 drives the pulse motors 6 and 10, which respectively feed the printing paper 2 and the transference ink ribbon 3 based on the type of data being recorded (color or black/white).

Figure 6:
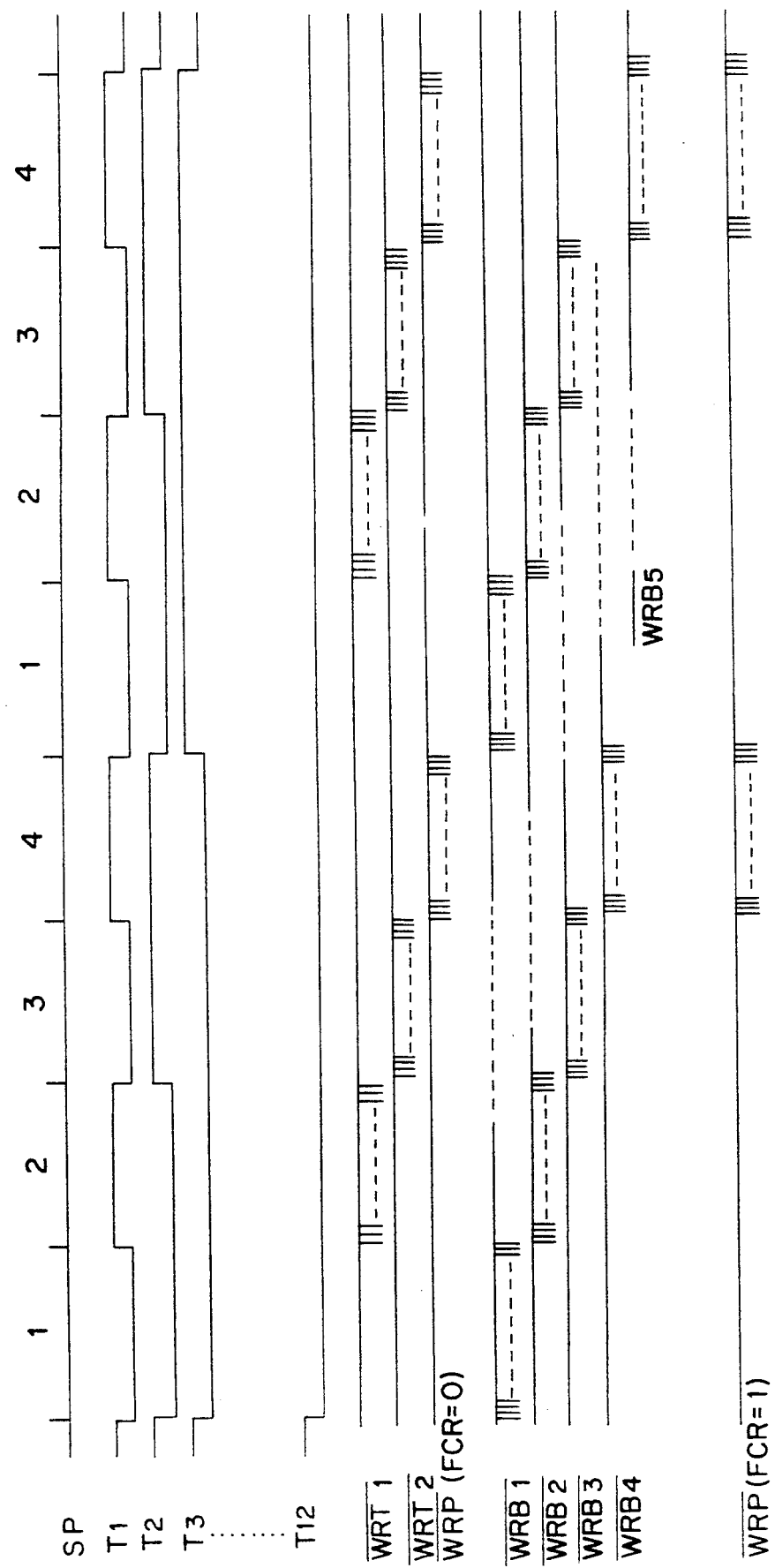

In accordance with reference pulse SP, which is generated synchronously with the activation of read-starting pulse of the color scanner 25 at the moment of supplying each 1-line data, the timing signal generator 37 outputs timing signals t0, t1,...t12 as shown in FIG. 5 and timing signals as shown in FIG. 6 including T1, through T12, WRT1, WRT2, WRP, WRB1, WRB2, WRB3, WRB4, and WRB5.

Figure 7:
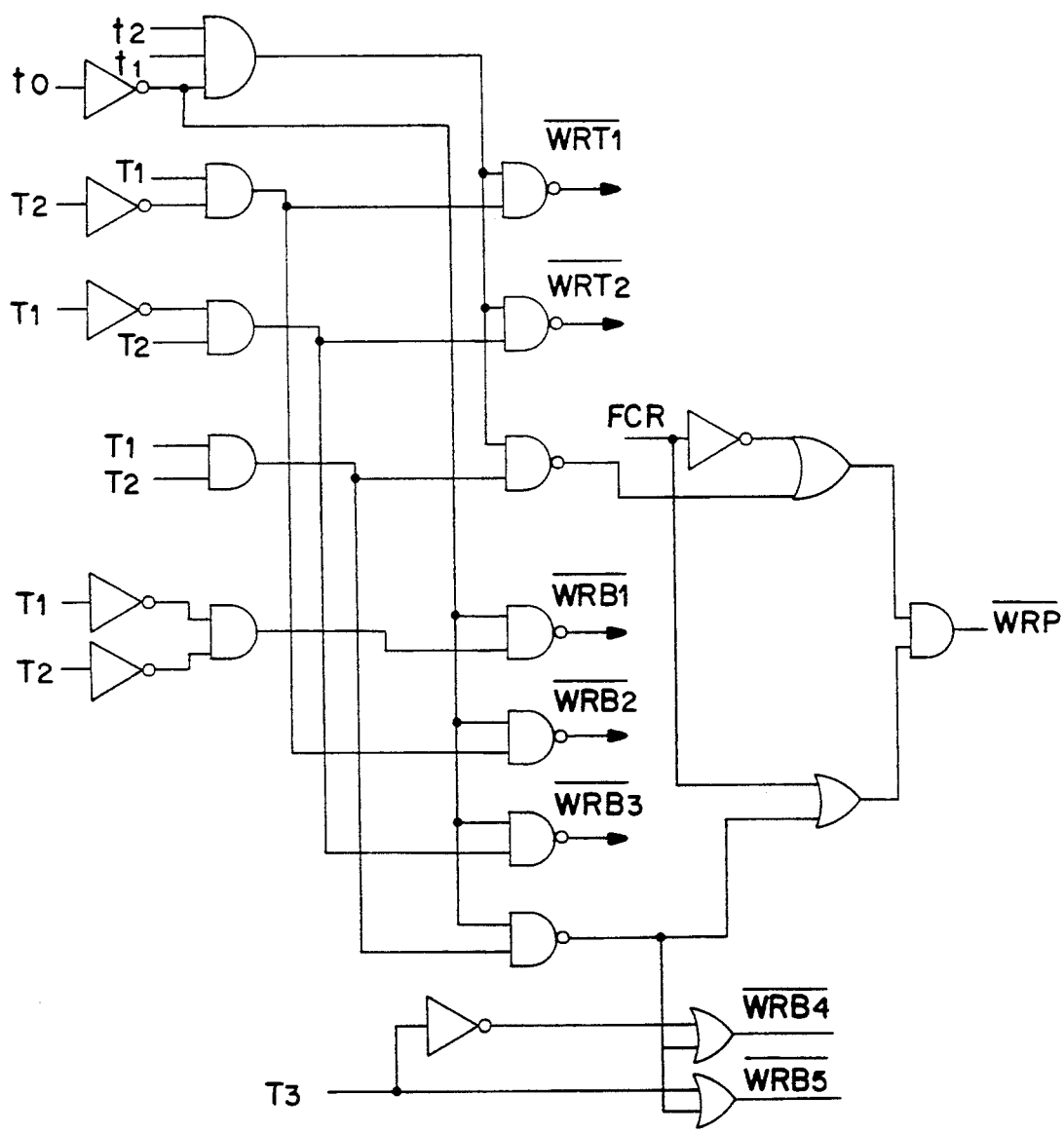
FIG. 7 is a simplified diagram of the gate circuit of one of the preferred embodiments of the present invention.

FIG. 7 is a block diagram of a gate circuit which generates timing signals WRT1, WRT2, WRP, WRB1, and WRB2 through WRB5. Timing signals WRT1 and WRT2 are respectively converted into clock signals used for buffer memory 30, whereas timing signals WRB1 through WRB5 are respectively converted into clock signals used for buffer memory 31. Timing signal WRP is converted into a write-control signal for use with page memory 33.

Referring now to the operation timing chart shown in FIG. 6, periods 1 through 4 are determined by reference pulse SP. When reading a colored original image during period 1, the main controller causes only the red light-generating source to turn on, allowing the color scanner to read one line of the original picture. (Note that period 1 is not necessarily utilized when receiving color gradation data from a data processor.) On the other hand, when reading a black/white original image during period 1, all the light sources are lit and black/white concentration data for one line of the original are outputted from the scanner.

When reading a colored original image during period 2, color gradation data (red) generated during period 1 are outputted from the scanner and the green light source turns on, allowing the color scanner to scan the next line of the original color picture. On the other hand, when reading a black/white original image during period 2, the next line is scanned using all the light sources being lit and a line of black/white concentration data is outputted by the scanner.

When period 3 is carried out in the color mode, color gradation data (green) generated during period 2 are outputted by the scanner, and the system reads the next line of the colored original by turning on the blue light-generating source. In the black/white mode, the next line is scanned with all the light sources being lit and a line of the black/white concentration data is outputted.

Activation of period 4 in the color mode causes the system to output color gradation data (blue data) generated during period 3. This delay in the outputting of color gradation data is to compensate for the the time needed to average the CCD output carried out by color scanner 25. The scanner generates the color gradation data by using conventional averaging techniques. On the other hand, in the black/white mode, the scanner generates and outputs the next line of black/white concentration data in the same manner as periods 1-3.

When one full cycle (periods 1 through 4) has been performed, either a plurality of picture elements of color gradation data or a plurality of picture elements of black/white concentration data has been outputted by the scanner. By repeating and sequentially executing these operation cycles, the color scanner completes the reading of the original image. Upon completion of one full cycle, the present invention has scanned four lines of the original to generate either one line of color gradation data or four lines of black/white concentration data, according to the operational mode, thereby the difference in resolution between the modes of operation.

Figure 8:
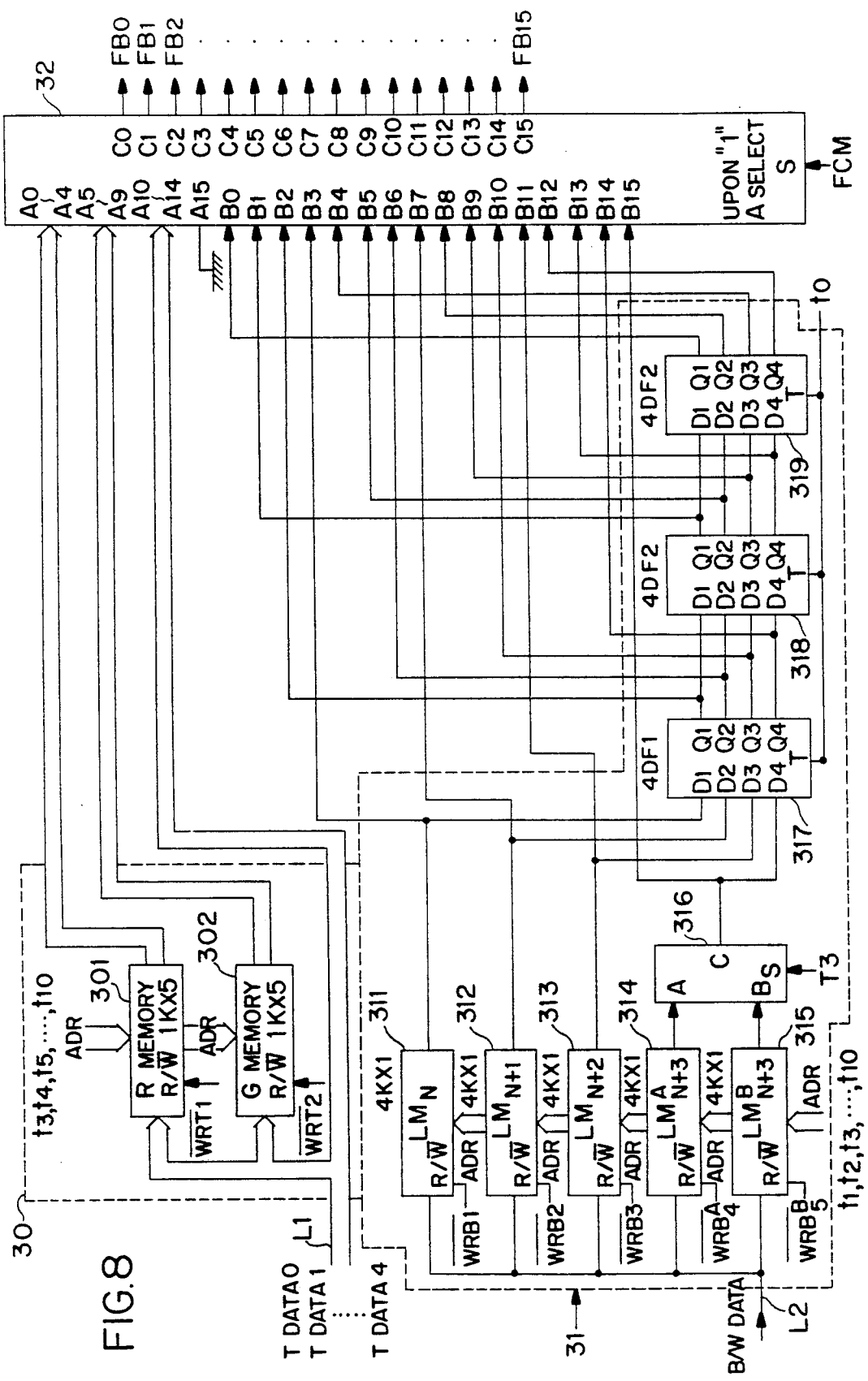
FIGS. 8 and 9 are block circuit diagrams denoting details of the arrangement shown in FIG. 1.
Figure 9:
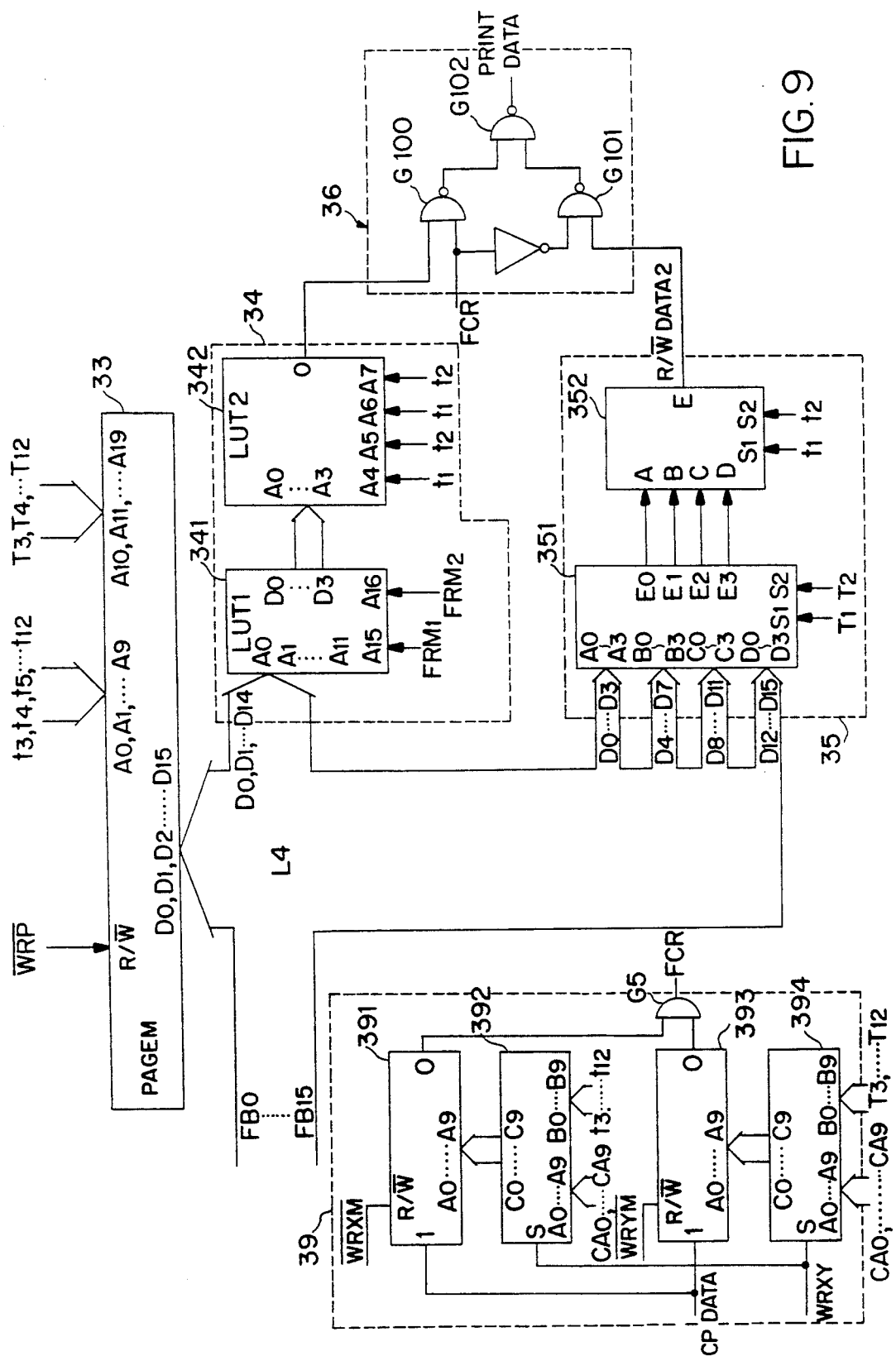

FIG. 8 illustrates the details of a circuit comprising the buffer memories 30 and 31 and the data selector 32. FIG. 9 also illustrates the details of a circuit comprising the page memory 33, the look-up table 34, the data selector 35, the gate circuit 36, and the color control circuit 39.

The buffer memory 30 comprises a R-memory (red data) 301 and a G-memory (green data) 302 and uses timing signals t3 through t10 to form the address signals. Using timing signals WRT1 and WRT2 to control the writing operations, the buffer memory 30 stores 5-bit color gradation data including TDATA0 through TDATA4 which are outputted from the color scanner 25. Color gradation data outputted during period 2 is stored in R-memory (red data) 301, whereas color gradation data outputted during period 3 is stored in G-memory (green data) 302. Data signals outputted from memories 301 and 302 are received by terminal A group comprising terminals A0 through A9 of the data selector 32. On the other hand, color gradation data TDATA0 through TDATA4 outputted during period 4 are directly received by terminal A group comprising terminals A10 through A14 of the data selector 32. Terminal A15 is held at ground (redundant bit).

In response to the select signal FCM from the main controller 38, the data selector 32 selects all the data related to the terminal A group, terminals A0 through A14, and outputs from terminal C group comprising terminals C0 through C15. Data from the data selector 32 is received by the page memory 33 via the data bus L4. The page memory 33 receives timing signals t3 through t12 which function as address signals and timing signal WRP which functions as a write-control signal during period 4. Using these signals, the page memory 33 stores color gradation data signals received via the data bus L4. The buffer memory 31 comprises 5 units of line buffer memories including 311 through 315, data selector 316, and three latches 317 through 319. The line buffer memories 311 through 315, respectively, receive timing signals WRB1 through WRB5 which function as read/write signals, alternatively. In addition, line buffer memories 311 through 315, respectively, receive timing signals t1 through t10 which function as address signals.

In response to the timing signals including WRB1 through WRB5, and t1 through t10, the black/white concentration data (B/WDATA) are fed from the color scanner 25 via the data bus L2 and are written into line buffer memories 311, 312, 313, and 314 or 315. The line buffer memories 314 and 315 are switched to each other after completion of each cyclic operation 1 through 4 so that black/white concentration data (B/WDATA) can be written into these memories. Specifically, the data present in the odd multiple of the fourth line is written into the line buffer memory 314, whereas data present in the even multiple of the fourth line is written into the line buffer memory 315. Data signals outputted from these line buffer memories 314 and 315 are received by a data selector 316. When either of these line buffer memories, 314 or 315, is engaged in data writing, the data selector 316 selects the specific data stored in the other line buffer memory during the preceding cyclic operation and then outputs black/white concentration data along with the other line buffer memories 311, 312, and 313. Consequently, black/white concentration data of the original picture image in the first line is written into the line buffer memory 315, then black/white concentration data in the following lines are sequentially written into the line buffer memories in the order of 311, 312, 313, 314, 311, ..., 313, and 315.

Data outputted from the line buffer memories 311, 312, and 313, and data selector 316 are, respectively, received by the data selector 32 and a latch 317. Latches 317, 318, and 319, respectively, split data in the sub-scan direction from the serial data outputted from the line buffer memories 311, 312, and 313, and the data selector 316. The signal from the latch 317 is fed to the latch 318, and the signal from the latch 318 is fed to the latch 319. Signals from the latches 317, 318, and 319 are all received by the data selector 32. This allows the line buffer memories 311 through 315 to respectively output black/white concentration data starting from picture elements at the left end of the original picture image to be received by the terminal B group of the data selector 32 starting with terminal B0 to B15. On the other hand, in response to the select signal FCM, the data selector 32 outputs data related to terminal B group, terminals B0 through B15 in a 16-bit format to terminal C group which comprises terminals C0 through C15. Black/white concentration data from the data selector 32 are stored in the page memory 33 in the same way as the color gradation data described above.

In FIG. 9, the color control circuit 39 comprises a X-memory 391, a Y-memory 393, and data selectors 392 and 394. The X-memory 391 stores X-coordinate information of one of the compartments of the page memory 33, thereby controlling the writing of color gradation data. Digital code "1 " is written into a memory area that corresponds to X-coordinate of one of the compartments storing color gradation data. A Y-memory 393 stores Y-coordinate information of one of the compartments of the page memory 33, thereby controlling the writing of color gradation data. Digital code "1" is written into a memory area that corresponds to Y-coordinate of one of the compartments storing color gradation data. Black/white concentration data are written into the compartments other than those which contain X-Y coordinates specified by the X-memory 391 and the Y-memory 393.

The main controller 38 outputs data CPDATA comprised of a "1 " or "0 " to the X-memory 391 and the Y-memory 393. This data CPDATA is written into these memories in accordance with the address data and write-control signals WRXM and WRYM received from data selectors 392 and 394. When the X-memory 391 and the Y-memory 393 store coordinate data, in accordance with control signal WRXY received from the main controller 38, the data selectors 392 and 394 select the address data CA0 through CA9 from the main controller 38 to be outputted to the X-memory 391 and Y-memory 393. When data is read out from the page memory 33, i.e., when an image picture is to be recorded by the color printer, the X-memory 391 and the Y-memory 393 are addressed by incoming data T3 through T12 from terminal B group comprising terminals B0 through B9 from the data selectors 392 and 394. When signals from the X-memory 391 and the Y-memory 393 exactly correspond to each other, a color control signal FCR is outputted from the main controller 38.

Referring, as an example to FIG. 9, the page memory 33 receives write-control signal WRP and timing signals functioning as address data including t3 through t12 and T3 through T12 so that a substantial amount of data corresponding to an A4 size sheet of paper can be written into this memory. When reading data out of the page memory 33, a write control signal WRP is not generated, but by feeding the address data, either 16-bit color gradation data or 16-bit black/white concentration data is placed upon data bus L4 from each compartment of the page memory 33.

Color gradation data is received by the look-up table 341 as address data for the ROM. When this operation is underway, data D0, D1, D2, and D3, which are respectively converted into yellow, magenta, cyan and black by coded color designation signals FRM0 and FRM1 outputted from the main controller 38, are read from the look-up table 341. Signal conversion is executed according to the specific relationship shown below.

| FRM0 | FRM1 | |
|------|------|------|
| 0 | 0 | Y |
| 1 | 0 | M |
| 0 | 1 | C |
| 1 | 1 | BK |

Before being outputted from the look-up table 341, based on color designation signals FRM0 and FRM1, the 4-bit data D0, D1, D2, and D3 are generated from a conversion of the 15-bit red, green, and blue color-gradation data. Out of a maximum of 16 possibilities, specific data denoting a printable amount of each color is received by the other look-up table 342. Using the 4-bit data D0, D1, D2, D3, and timing signals t1, t2, T1, and T2 as address signals, the look-up table 342 outputs data containing a specific recording data coded for a unit of printing elements which form a 4×4 matrix.

Figure 10:
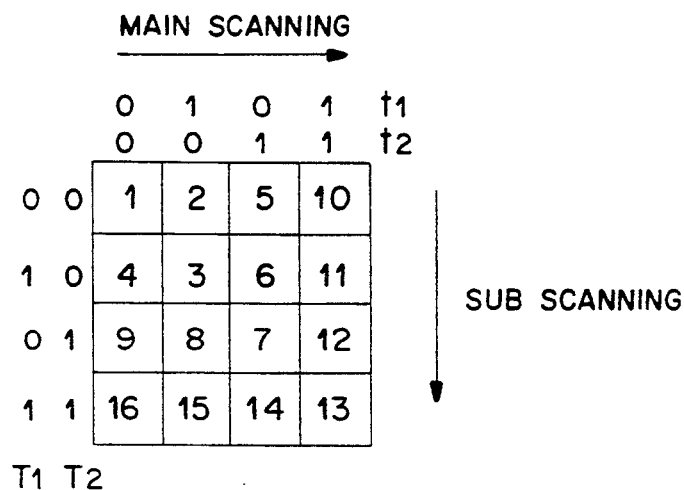
FIG. 10 is the matrix arrangement of the picture elements related to one of the preferred embodiments of the present invention.

FIG. 10 denotes an example of a matrix of print elements. For example, if data "8" is outputted from the look up table 341, a digital value "1" is outputted from the other look-up table 342 indicating the recording of all the matrix compartments having a digital value of less than 8. Data outputted from the look-up table 342 is received by the shift register 41 (shown in FIG. 1) as the print data "1" via gates G-100 and the G-102. When control signal FCR is "0", i.e., when black/white concentration data are outputted from the page memory 33, the gate G-101 is activated, thus allowing the data signal from the data selector 352 to be received by shift register 41 as print data. 16-bit data from the page memory 33 are outputted, as a 4-bit data unit, to input terminal groups A, B, C, and D of the data selector 351. The specific data present at one of these input terminals are outputted to the data selector 352 according to timing signals T1 and T2 given as selection signals. The data selector 351 outputs the data that correspond to the sub-scan direction of 4×4 matrix compartments, i.e., recording lines, whereas the data selector 352 outputs data that correspond to the main scan direction, i.e., dots of thermal head 1. As described above, by jointly storing black/white concentration data and color gradation data based on 16-bit units, the page memory 33 can securely simplify control operations.

In the described embodiment, data related to red, green, and blue are written into a page memory 33. Needless to say, these colors may be replaced by yellow, magenta, and cyan. In addition, the page memory 33 may also be installed in either a data processor or color scanner unit in place of color printer.

OPERATION OF THE PRESENT INVENTION

Figure 11A:
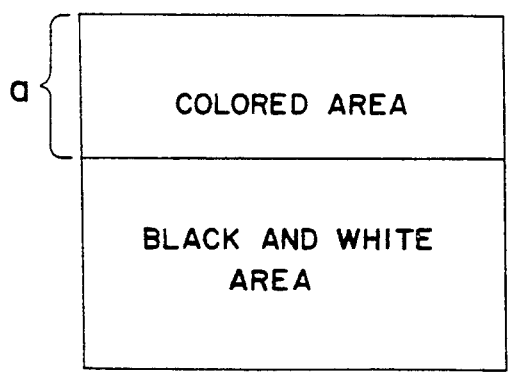
FIGS. 11(A) and 11(B) are examples of the layout of original documents to be copied.
Figure 11B:
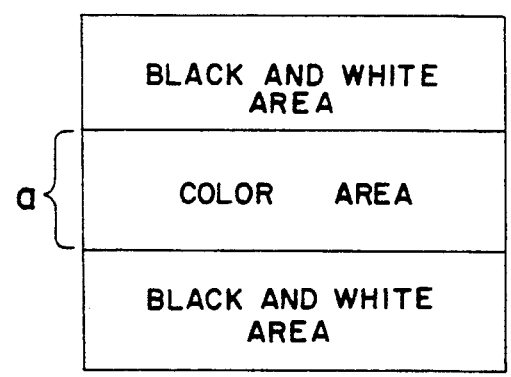

The operations of the present invention will be described utilizing FIGS. 11(A), 11(B), 12(A), 12(B), and 12(C). To read an original as shown in FIG. 11(A) or FIG. 11(B) in which color data and black/white data are both present, an operator inputs the coordinates to describe the area bounded by "a" by operating the area designating keys 38b, coordinates of which are fed to controller 38. The area designating keys 38b are well known and can be a conventional key input pad which allows the user to input X and Y coordinate information. This X and Y coordinate information would correspond to the data image area. The main controller 38 outputs a signal c to indicate a color read operation to the light source control circuit 38c when the reading position of the scanner is within the area bounded by "a". When the reading position of the scanner is outside the area bounded by "a", the main controller 38 outputs the signal b to indicate a black/white read operation. The light source control circuit 38c outputs control signals so that the RGB light source of the scanner 25 are sequentially turned on and off (when in the color reading mode) (one color lamp being lit per scanned line) so long as the light source control circuit 38c receives the signal c. When the light source control circuit 38c receives the signal b, the circuit 38c outputs the control signal so that all the RGB light sources are simultaneously turned on (when in the black/white reading mode) (each scanned line is illuminated by all the light sources simultaneously).

Accordingly, the colored area of the original picture is read during the color mode and is stored in the buffer memory 30 because the time color/black-white switching signal FCM is supplied to the data selector 32 from the main controller 38 to select the buffer memory 30. The color data in the buffer memory 30 is stored in a color storing area of the page memory 33.

Subsequently, when the reading position of the scanner is outside the area bounded by "a", the black/white area of the original can be read in the black/white mode. The information read from the original is stored in the buffer memory 31. The data selector 32 selects the buffer memory 31 in response to the color/ black-white switching signal FCM. The black/white data can then be stored in a black/white data area of the page memory 33.

In the manner mentioned above, when the color data and black/white data are stored in the page memory 33, the contents of the page memory 33 are accessed from the leading address for performing printing. Since the logic level of the color control signal FCR is "1" in a period during which the color storing area of the memory 33 is addressed, (it is noted that the color control signal FCR is "0" when the black/white storing area is addressed), the color data read from the page memory 33 are transmitted to the shift register 41 through the look-up table 34 and gate circuit 36. When the color data are completely read and the black/white storing area are addressed, the control signal FCR changes from "1" to "0". The black/white data are then transmitted to the shift register 41 through the data selector 35 and gate circuit 36.

It is noted that when a complete color original or a complete black/white original is read, the select key 38a is used. For example, when a color original is read, since the color/black-white switching signal FCM for selecting the buffer memory 30 is supplied to the data selector 32 from the main controller 38, the color data read by scanner 25 in the color mode are stored in the total storing area of the page memory 33 under the address control of the main controller 38. The signal c/b is sent to the light sources by the main controller 38 having the same value described above with respect to the color mode. The color data read out from the page memory 33 for printing are transmitted to the register 41 through the look-up table 34 and the gate circuit 36. At this time, the signal FCR is 1, and the gate circuit connects the table 34 and the register 41.

Figure 12A:
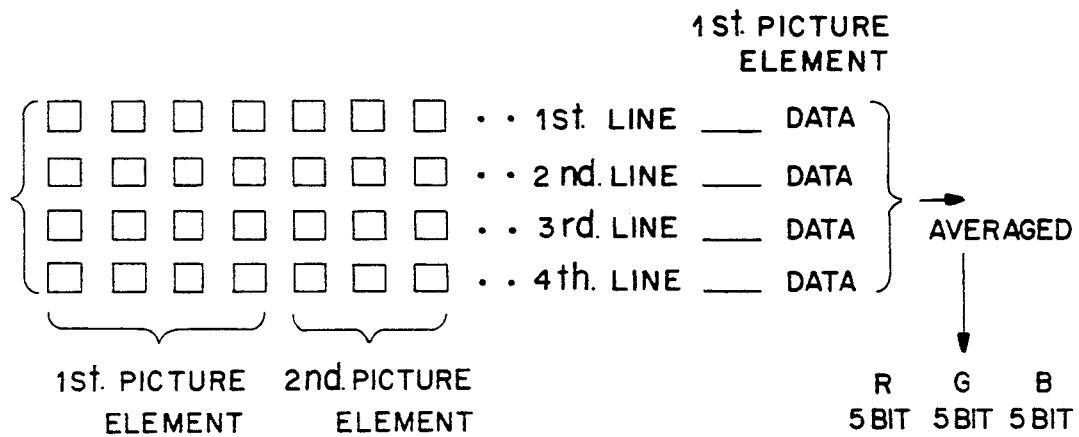
FIGS. 12(A), 12(B), and 12(C) show diagrams to demonstrate the color copying mode and the black/white copying mode.
Figure 12B:
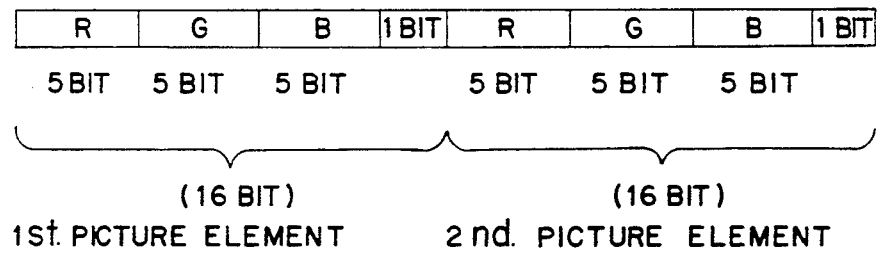
Figure 12C:
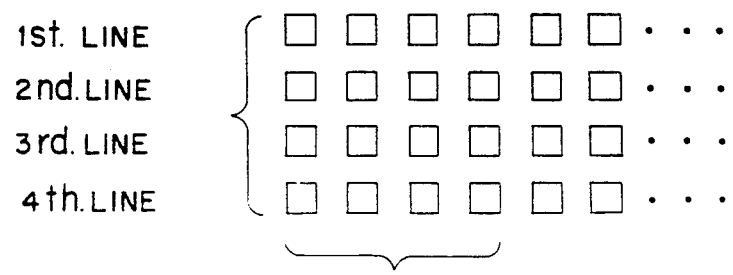

The formation of a picture element is shown in FIGS. 12(A), 12(B), and 12(C). In FIGS. 12(A) and 12(C), a square represents one CCD element.

During a color mode, one picture element comprises 5 bits of R data, 5 bits of G data and 5 bits of B data. Respective R, G and B 5-bit data are the average of the data received by the individual CCD elements scanning four lines of the original. The color scanner utilizes a 4-bit wide CCD unit to generate the 5-bit average or color gradation data. This utilization in conjunction with the 4-line scan needed to generate one line of color data, the picture element is defined by a matrix of 4×4 CCD elements. The color gradation data are then stored in the page memory 33 as shown in FIG. 12(B).

During a black/white mode, one picture element is composed of bit data from each individual CCD element of a 4×4 matrix of CCD elements. The black/white data are stored in 16-bit format, similar to the color data, but the bits relate to the main scan direction and sub scan direction, i.e., four scan lines by four CCD elements deep (sub-scan direction).

As is clear from the foregoing explanations, the preferred embodiment of the present invention provides a device for storing both color picture recording data and black/white picture recording data using an identical bit format. This allows the system to easily access the memory and, as a result, makes it possible for the entire system to employ a simplified hardware and software needed to process the picture data.

While only certain embodiments of the present invention have been described, it will be apparent to those skilled in the art that various changes and modifications may be made therein without departing from the spirit and scope of the present invention as claimed.

What is claimed is:

1. A picture data memory system comprising;
   picture memory means for storing binary data representing both color gradation data or black/white concentration data for each picture element of an original picture to be processed;
   controller means for producing either a color or a black/white mode select signal in response to a color or black/white mode selected by a user;
   scanner means for producing either color gradation data or black/white concentration data of the original picture scanned by said scanner means in response to said mode select signal;
   first buffer memory means for storing color gradation data produced by said scanner means;
   second buffer memory means for storing black/white concentration data produced by said scanner means; and
   selector means for selecting data from either said first or said second buffer memory means to be written into a specific address of said picture memory means;
   wherein the number of bits representing color gradation data or black/white concentration data written into each address of said picture memory means are set to be equal to each other.

2. The system as claimed in claim 1, wherein said picture element is equal to an area represented by a four by four matrix of charge coupled devices.

3. A method for producing and storing either color gradation data or black/white concentration data from a single color scanner, comprising the steps of:
   (a) inputting a mode selection signal;
   (b) determining if the mode selection signal represents a color image process;
   (c) producing color gradation data from a full scan process when said step (b) determines a color image process is selected; and
   (d) storing one picture element of color gradation data at one address in a memory;
   said step (c) including the steps of,
   (e) scanning a first line of an original image using a red light source,
   (f) producing five bits of data per picture element representing color gradation data of a red color component of the color image,
   (g) scanning a second line of the original image using a green light source,
   (h) producing five bits of data per picture element representing color gradation of a green color component of the color image,
   (i) scanning a third line of the original image using a blue light source,
   (j) producing five bits of data per picture element representing color gradation of a blue color component of the color image, and
   (k) scanning a fourth line of an original image using no light to allow the full scan process to compensate for output of charge coupled devices of the scanner, thereby producing a single line of picture elements of color gradation data wherein each picture element has fifteen bits of color gradation data and one redundant bit for a total of sixteen bits per picture element.

4. The method as claimed in claim 3, further comprising the steps of:
   (1) producing black/white concentration data when said step (b) determines a black/white image process is selected;
   said step (1) including the steps of,
   (m) scanning the first line of the original image using the red, green, and blue light sources simultaneously,
   (n) producing four bits of black/white concentration data per picture element for the first line, (o) scanning the second line of the original image using the red, green, and blue light sources simultaneously, (p) producing four bits of black/white concentration data per picture element for the second line, (q) scanning the third line of the original image using the red, green, and blue light sources simultaneously, (r) producing four bits of black/white concentration data per picture element for the third line, (s) scanning the fourth line of the original image using the red, green, and blue light sources simultaneously, (t) producing four bits of black/white concentration data per picture element for the fourth line;

(u) storing four lines of black/white concentration data at one address in the memory wherein one line of black/white concentration data stored in one address has four bits of black/white concentration data, thereby allowing sixteen bits of black/white concentration data to be stored at one address in the memory.

5. The method as claimed in claim 4, wherein the color image process realizes a resolution of three lines per millimeter and the black/white image process realizes a resolution of twelve lines per millimeter.

6. The method as claimed in claim 3, wherein each picture element represents a scan by a four by four matrix of charge coupled devices.

7. A method for producing and storing either color gradation data or black/white concentration data from a single color scanner, comprising the steps of:

(a) inputting a mode selection signal;

(b) determining if the mode selection signal represents a color image process;

(c) producing color gradation data from a full scan process when said step (b) determines a color image process is selected; and (d) storing one picture element of color gradation data at one address in a memory;

said step (c) including the steps of, (e) scanning a first line of an original image using a first light source, (f) producing five bits of data per picture element representing color gradation data of a color component of the color image corresponding to the first light source, (g) scanning a second line of the original image using a second light source, (h) producing five bits of data per picture element representing color gradation of a color component of the color image corresponding to the second light source, (i) scanning a third line of the original image using a third light source, (j) producing five bits of data per picture element representing color gradation of a color component of the color image corresponding to the third light source, and (k) positioning the scanner to imitate a scan of a fourth line of an original image by using no light to allow the scanner to complete production of color gradation data corresponding to the third light source before the scanner starts the production of color gradation data for a full scan process of a next single line of the color image, thereby producing a single line of picture elements of color gradation data wherein each picture element has fifteen bits of color gradation data and one redundant bit for a total of sixteen bits per picture element;

said steps (e), (f), (g), (h), (i), (j) and (k) defining a full scan process for a color scan.

8. The method as claimed in claim 7, further comprising the steps of:

(l) producing black/white concentration data when said step (b) determines a black/white image process is selected; and said step (l) including the steps of, (m) scanning the first line of the original image using the first, second, and third light sources simultaneously, (n) producing four bits of black/white concentration data per picture element for the first line, (o) scanning the second line of the original image using the first, second, and third light sources simultaneously, (p) producing four bits of black/white concentration data per picture element for the second line, (q) scanning the third line of the original image using the first, second, and third light sources simultaneously, (r) producing four bits of black/white concentration data per picture element for the third line, (s) scanning the fourth line of the original image using the first, second, and third light sources simultaneously, (t) producing four bits of black/white concentration data per picture element for the fourth line; and (u) storing four lines of black/white concentration data at one address in the memory wherein one line of black/white concentration data stored in one address has four bits of black/white concentration data, thereby allowing sixteen bits of black/white concentration data to be stored at one address in the memory.

9. The method as claimed in claim 8, wherein the color image process realizes a resolution of three lines per millimeter and the black/white image process realizes a resolution of twelve lines per millimeter.

10. The method as claimed in claim 7, wherein each picture element is equal to an area corresponding to an area established by a four by four matrix of charge coupled devices.

* * * * *